UNITED STATES PATENT OFFICE.

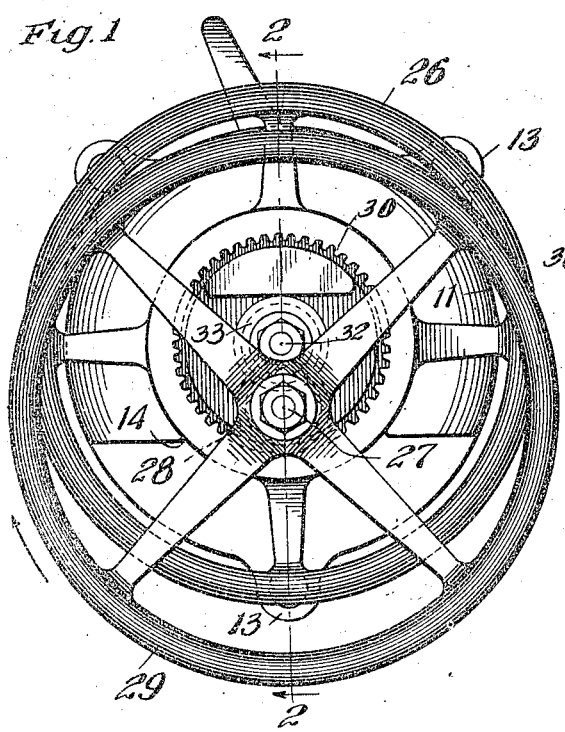
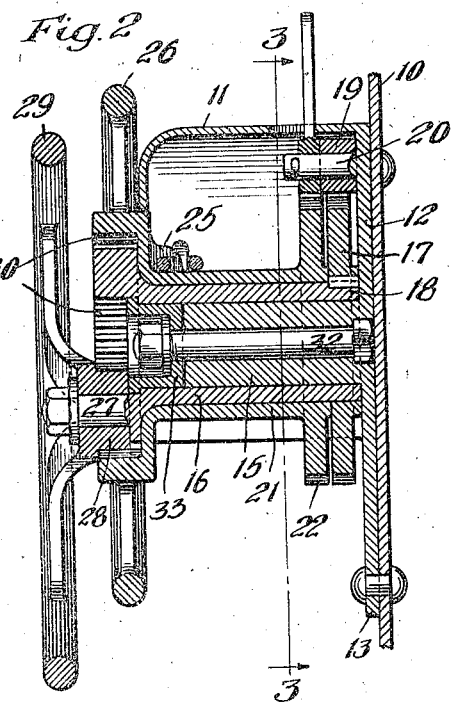
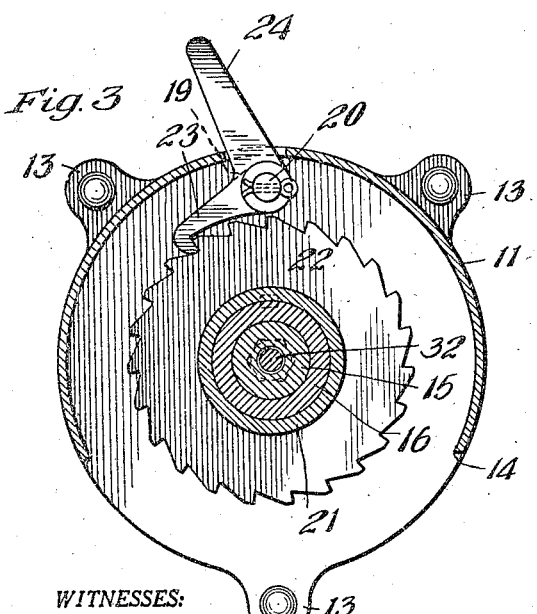

JOHN F. O'CONNOR, OF CHICAGO, ILLINOIS, ASSIGNOR TO WILLIAM H. MINER, OF CHAZY, NEW YORK.

HAND-BRAKE.

1,300,478.

Specification of Letters Patent.

Patented Apr. 15, 1919.

Application filed July 1, 1918. Serial No. 242,827.

*To all whom it may concern:*

Be it known that I, JOHN F. O'CONNOR, a citizen of the United States, residing at Chicago, in the county of Cook and State of Illinois, have invented a certain new and useful Improvements in Hand-Brakes, of which the following is a full, clear, concise, and exact description, reference being had to the accompanying drawings, forming a part of this specification.

This invention relates to improvements in hand brakes.

The object of the invention is to provide a hand brake adapted more particularly for railway freight cars and so arranged that the slack in the brake chain may be rapidly taken up and thereafter the chain tightened at a slower speed but with greater leverage ratio.

More specifically, the object of the invention is to provide a hand brake for railway cars wherein the preliminary winding movement of the chain to take up the slack is effected by one hand wheel and the final tightening of the chain effected by another hand wheel.

In the drawing forming a part of this specification, Figure 1 is an end elevational view of a hand brake embodying my improvements showing the same as applied to the wall of a box car. Fig. 2 is a vertical, sectional view, taken substantially on the line 2—2 of Fig. 1. And Fig. 3 is a sectional view taken substantially on the line 3—3 of Fig. 2.

In said drawing, 10 denotes the wall of a car to which my improved brake is adapted to be applied. The brake, as shown, comprises a housing or casing 11 of substantially cylindrical formation and having an integral inner wall 12 from which extend perforated ears 13 so that the casing may be riveted to the car wall. The casing 11 is suitably cut away at the bottom as indicated at 14 to permit of the entrance of the brake chain.

The wall 12 of the casing is preferably formed with an integral post 15 extending outwardly from the wall but terminating inside of the plane of the outer end wall of the casing 11. Said post 15 forms a bearing for a sleeve bearing 16, the latter having a ratchet wheel 17 keyed thereto at its inner end as indicated at 18. Coöperable with said ratchet wheel 17 is a locking gravity-actuated dog 19 pivotally mounted on a stud 20 formed integrally with the wall 12. The dog 19 is adapted to prevent rotation of the ratchet wheel 17 in a counterclockwise direction as the structure is viewed in Fig. 3.

Rotatably mounted on the sleeve bearing 16 is a chain winding drum 21, the latter being formed with an integral ratchet wheel 22 at its inner end with which coöperates another gravity-actuated locking dog 23, also adapted to prevent accidental counterclockwise rotation of the drum, as viewed in Fig. 3. The locking dog 23 is mounted on the said stud 20 and is provided with a handle 24 extending through a suitable opening in the casing so that the dog 23 may be released. The chain is secured to the drum 21 by any suitable means, such as the flange indicated at 25 in Fig. 2.

To operate the brake, the drum 21 is preferably provided with an integral end wheel 26 disposed adjacent the outer end of the casing 11 and by which the drum 21 may be rotated directly during the preliminary winding movement of the chain to take up slack. In addition, the sleeve bearing 16 is provided with an eccentric stud 27 at its outer end on which is rotatably mounted a pinion 28 forming the hub of a second hand wheel 29. Said pinion 28 is adapted to coöperate with an internal gear wheel 30 formed integrally with the drum 21 and hand wheel 26. To effect the higher leverage ratio winding of the chain, the operator employs the hand wheel 29 and rotates it in a clockwise direction which, because of the sleeve bearing 16 being held against counterclockwise rotation by the dog 19, will cause the drum 21 to be rotated in a clockwise direction, and thus continue the winding up of the chain but with the obviously increased leverage ratio. To release the chain, it is evident that the operator will disengage the dog 23 which will permit the drum 21 to rotate in a counterclockwise direction under the tension of the brake chain. To hold the drum and sleeve bearing in proper position within the casing, the post 15 is preferably centrally slotted and a bolt 32 extended therethrough, said bolt at its outer end having a nut thereon seated within a hollow flanged cap washer 33.

I claim:

1. In a winding mechanism of the character described, the combination with a winding drum, of means for rotating said drum directly at a relatively high speed, and means for rotating said drum at a relatively low speed but with a higher leverage ratio, said last named means including a sleeve bearing on which said drum is rotatably mounted and a hand wheel rotatably mounted about an axis eccentric to the axis of the drum.

2. In a winding mechanism of the character described, the combination with a member adapted to be secured to a car wall and provided with a support, of a sleeve bearing mounted on said support, a hand wheel having a pinion rotatably mounted on said sleeve bearing, a winding drum rotatably supported on said sleeve bearing, and gear means interposed between said pinion and drum for rotating the latter upon rotation of said hand wheel.

3. In a winding mechanism of the character described, the combination with a member adapted to be secured to a car wall and provided with a support, of a sleeve bearing mounted on said support, a hand wheel having a pinion rotatably mounted on said sleeve bearing, a winding drum rotatably supported on said sleeve bearing, and gear means interposed between said pinion and drum for rotating the latter upon rotation of said hand wheel, and means for preventing accidental reverse rotation of said drum and sleeve bearing.

4. In a winding mechanism of the character described, the combination with a housing adapted to be secured to a wall, said housing having a bearing post therein, of a sleeve bearing rotatably mounted on said post, means for preventing rotation of said sleeve bearing in one direction, a winding drum rotatably mounted on said sleeve bearing, means for preventing accidental rotation of said drum in one direction, a hand wheel rotatably mounted on said sleeve bearing, and gearing interposed between said hand wheel and drum for effecting rotation of the latter in one direction.

5. In a winding mechanism of the character described, the combination with a housing adapted to be secured to a car wall or the like, said housing being provided with a bearing post, of a bearing sleeve rotatably mounted on said post, a winding drum rotatably mounted on said bearing sleeve, means for preventing accidental rotation of said sleeve and drum in one direction, a hand-wheel for directly rotating said drum, a hand wheel rotatably mounted on said sleeve bearing, an internal gear carried by said drum, and a pinion rotatable in unison with the second named hand wheel and coöperable with the internal gear for rotating the drum.

In witness that I claim the foregoing I have hereunto subscribed my name this 15th day of June, 1918.

JOHN F. O'CONNOR.